United States Patent
Balali et al.

(10) Patent No.: US 12,474,683 B2
(45) Date of Patent: Nov. 18, 2025

(54) INTELLIGENT ELECTRIC VEHICLE SUPPLY EQUIPMENT ENERGY MANAGEMENT

(71) Applicant: Volta Charging, LLC, San Francisco, CA (US)

(72) Inventors: Mohammad Balali, San Francisco, CA (US); Haroon Ali Akbar, Montreal (CA); David J. Klein, San Francisco, CA (US)

(73) Assignee: Volta Charging, LLC, San Francisco, CA (US)

( * ) Notice: Subject to any disclaimer, the term of this patent is extended or adjusted under 35 U.S.C. 154(b) by 344 days.

(21) Appl. No.: 18/091,171

(22) Filed: Dec. 29, 2022

(65) Prior Publication Data

US 2023/0229126 A1     Jul. 20, 2023

Related U.S. Application Data

(60) Provisional application No. 63/295,464, filed on Dec. 30, 2021.

(51) Int. Cl.
*G05B 19/042* (2006.01)
*B60L 53/63* (2019.01)
(Continued)

(52) U.S. Cl.
CPC ............ *G05B 19/042* (2013.01); *B60L 53/63* (2019.02); *B60L 53/67* (2019.02); *H02J 7/0048* (2020.01);
(Continued)

(58) Field of Classification Search
CPC .......... G05B 19/042; G05B 2219/2639; B60L 53/63; B60L 53/67; B60L 3/12;
(Continued)

(56) References Cited

U.S. PATENT DOCUMENTS

| | | | |
|---|---|---|---|
| 2003/0033057 A1* | 2/2003 | Kallestad | G06Q 40/12 700/277 |
| 2015/0005954 A1* | 1/2015 | Boeing | F04B 17/03 700/282 |

(Continued)

FOREIGN PATENT DOCUMENTS

| | | | | |
|---|---|---|---|---|
| CN | 111654073 A | * | 9/2020 | |
| GB | 2580405 A | * | 7/2020 | B60L 53/67 |

*Primary Examiner* — Santosh R Poudel
(74) *Attorney, Agent, or Firm* — Hickman Becker Bingham Ledesma LLP; Stephen J. Walder, Jr.

(57) ABSTRACT

Techniques are provided for dividing control of energy flow at multiple Electric Vehicle (EV) stations using the combination of a centralized controller and a plurality of decentralized controllers. The centralized controller is configured to perform: executing algorithms to generate centralized predictions for a first period of time, wherein the centralized predictions relate to energy usage at a plurality of stations, and generating one or more centralized baseline signals based on the centralized predictions. Each decentralized controller is configured to perform: receiving the one or more centralized baseline signals, monitoring interactions at a subset of the plurality of stations during the first period of time, and updating the one or more centralized baseline signals in real-time based on the interactions to produce one or more locally-updated baseline signal. The one or more locally-updated baseline signals are communicated to the subset of the plurality of stations, and energy flow is controlled at the subset of the plurality of stations based on the one or more locally-updated baseline signals.

20 Claims, 8 Drawing Sheets

(51) Int. Cl.
 *B60L 53/67* (2019.01)
 *H02J 7/00* (2006.01)

(52) U.S. Cl.
 CPC ...... *H02J 7/005* (2020.01); *G05B 2219/2639* (2013.01)

(58) Field of Classification Search
 CPC .......... B60L 53/51; B60L 53/52; B60L 53/53; B60L 53/56; B60L 53/68; H02J 7/0048; H02J 7/005; H02J 2203/20; H02J 3/003; H02J 3/322
 See application file for complete search history.

(56) References Cited

U.S. PATENT DOCUMENTS

| | | | |
|---|---|---|---|
| 2015/0291047 A1* | 10/2015 | Saito | B60L 53/30 |
| | | | 320/109 |
| 2018/0004172 A1* | 1/2018 | Patel | G05B 15/02 |
| 2019/0095266 A1* | 3/2019 | Chen | G06N 20/00 |
| 2021/0276447 A1* | 9/2021 | Kumar | B60L 53/66 |
| 2021/0285712 A1* | 9/2021 | Adetola | F25D 11/003 |
| 2024/0116388 A1* | 4/2024 | Kiessling | B60L 53/67 |

* cited by examiner

INTELLIGENT ELECTRIC VEHICLE SUPPLY EQUIPMENT ENERGY MANAGEMENT

BENEFIT CLAIM

This application claims the benefit under 35 U.S.C. § 119(e) of provisional application 63/295,464, filed Dec. 30, 2021, by Mohammad Balali et al., the entire contents of which is hereby incorporated by reference.

FIELD OF THE INVENTION

The techniques described herein relate to power flow control and, more specifically, using AI algorithms to efficiently manage the power flow between Electric Vehicles (EVs) and Electric Vehicle Supply Equipment (EVSE).

BACKGROUND

High adoption of Electric Vehicles (EVs) demands more advanced energy management strategies to efficiently manage the power flow through the electric supply chain network. High adoption of EVs leads to an increasing trend of the number of chargers at public, work, and home places. Consequently, there is a constant growth in energy consumption and generation around the world.

During the recent decades, an effort has been made to use renewable energy sources instead of traditional energy sources. Unfortunately, wind and photovoltaic (PV) are the least reliable sources of energy because of their dependence on wind speed and irradiance, resulting in their intermittent nature. Consequently, energy storage systems are usually coupled with these sources to increase the reliability of the hybrid system.

The ever-expanding Electric Vehicle Supply Equipment network has a significant impact on the grid, especially electric vehicle supply equipment capable of dispensing power at higher wattage e.g. a DCFC or an L3 station. During peak hours, this situation may translate into reduced power dispense at the electric vehicle supply equipment and hence a subpar customer experience. In a secondary scenario, some high-demand and high-traffic electric vehicle supply equipment may resort to dynamic or tiered pricing in order to discourage power dispense during peak hours. And lastly, in a tertiary scenario, some electric vehicle supply equipment may undergo a power outage and hence be rendered incapable to provide power dispensing services.

Energy Storage Systems (ESSs) are primarily integrated into the power supply network to store electricity for future uses once prices are higher or energy demands cannot be fully met by the primary source of energy. Energy storage systems can be integrated with Distributed Energy Resources (DERs), such as Solar PV panels, to reduce the burden on the grid and meet the electrical demand with green sources of energy. Intelligent algorithms are essential to efficiently manage the charging and discharging schedule of the energy storage systems, known as unit commitment.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Using the techniques described hereafter, an energy management system is configured to efficiently manage the power flow between Electric Vehicles (EVs) and electric vehicle supply equipment based on the decisions made by Artificial Intelligence (AI) algorithms. A novel AI-based control schema is provided, which includes both centralized and decentralized strategies to efficiently manage the power flow of the electric vehicle supply equipment network. The importance of an efficient and scalable energy management solution becomes more critical for high-demand periods, high-power stations, and stations with limited access to the electrical grid. Energy storage systems and distributed energy resources will be vital parts of the power supply network due to the high integration of the fast-charging stations and fast-growing EV adoption trend, which might exceed the electrical grid capacity. Consequently, the development of an intelligent data-driven energy management approach can significantly enhance the stability and quality of the power supply network by optimized management of the integrated energy storage systems and distributed energy resources.

The techniques described hereafter can be applied to all types of electric vehicle supply equipment and are not limited to DC Fast-Charging (DCFC). Therefore, the proposed architecture enables the electric vehicle supply equipment providers to efficiently communicate with utilities and EV drivers to optimize the power flow, while offering smart applications for utilities, such as Demand Response (DR), and interruptible service with motivating incentives to EV drivers.

Combining Centralized and Decentralized Strategies

Decentralized control strategies for EV power supply networks are combined with a centralized controller that has broader visibility to several stations and interactively communicates with the electrical grid. Electric vehicle supply equipment utilization rate, number of EV drivers which stop by at each station, distributed energy resources generations, and load profile are predicted by the centralized algorithms for a longer period of time, such as a day ahead horizon.

Figure 1:
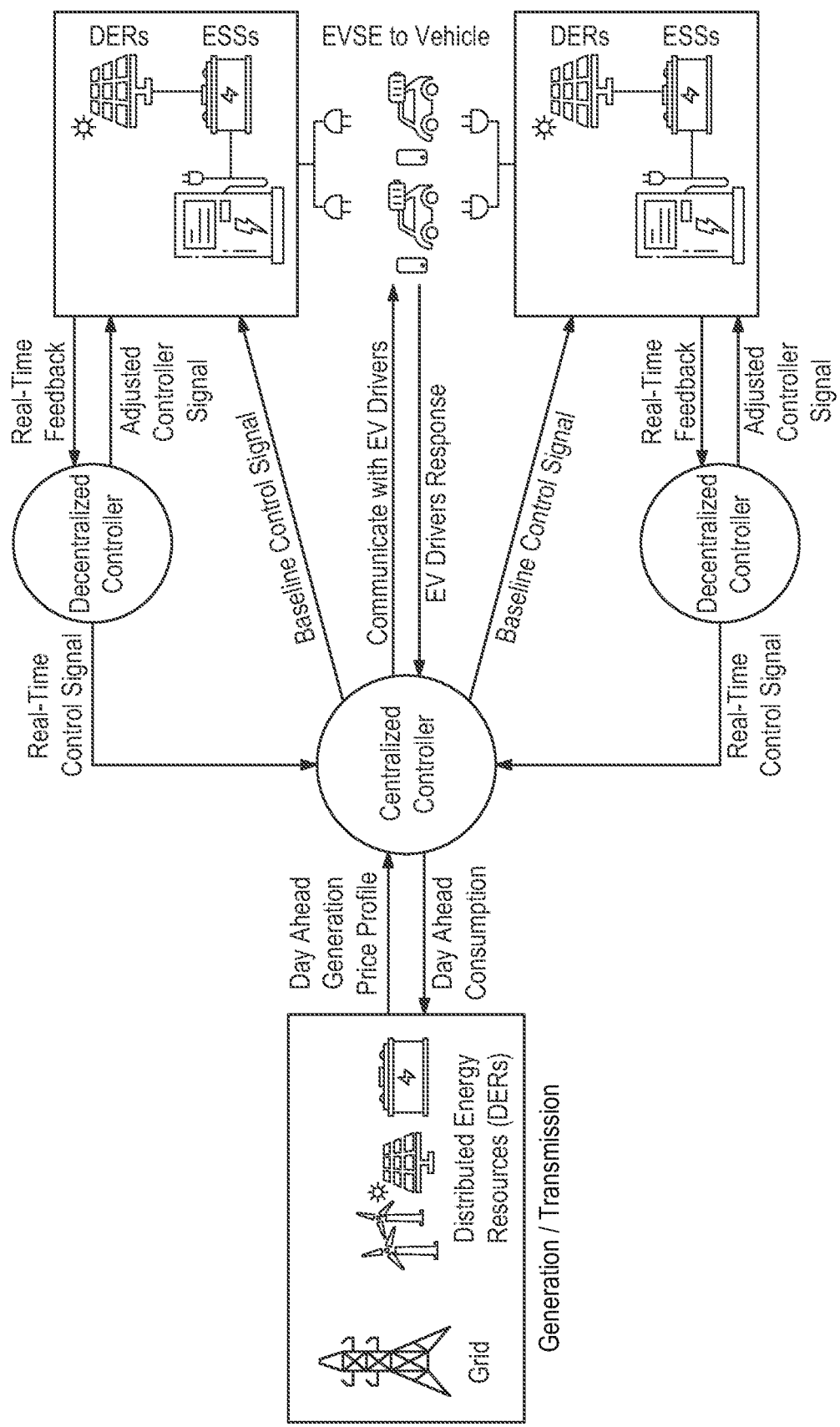
FIG. 1 is a block diagram illustrating an overview for managing power flow between EVs and electric vehicle supply equipment based on decisions made by AI algorithms, according to an implementation.

On the other hand, decentralized controllers focus on fewer stations, but dive deeper into the analyses. Indeed, the decentralized controllers gradually observe the interactions and update the baseline control signals in real-time. The decentralized controller performs the computations at the edge level in real-time. Therefore, baseline signals are updated based on the interactions that have occurred in real-time. For instance, the centralized controller provides the baseline signal based on the predicted values of the attributes, such as the number of EV drivers, weather-related conditions, guest visitation data, grid restrictions, etc. Some of these attributes are predicted based on various underlying assumptions. Consequently, uncertainties are attached to the baseline signal. On the other hand, the decentralized controller consequently adjusts the baseline signals as more real-time information becomes available. The adjusted signals are sent back to the centralized controller. Consequently, communications with EV drivers and the grid can be more robust and closer to real-time. The proposed architecture provides optimized latency of the analytics by distributing them into the cloud and edge levels. FIG. 1 shows an overview of the proposed approach.

Integrating Energy Storage Systems with EVSE Stations

Integrating energy storage systems into the electric vehicle supply equipment stations provides a variety of benefits, including:

Economic: Store energy once the electricity prices are lower. The stored energy will be released once the electricity prices are higher.
  a. Benefit 1: providing cost-saving opportunities for highly utilized charging stations.
  b. Benefit 2: providing opportunities to enroll in Demand Response programs while our stations are able to meet the demands.

Environment: Renewable Energy Resources (RSRs) coupled with energy storage systems can be efficiently integrated into electric vehicle supply equipment stations to provide clean, reliable, and uninterrupted service. Major concerns associated with Renewable Energy Resources (RSRs) are uncertainty and unpredictability. Energy Storage Systems can help create more reliable and dispatchable systems by adjusting charging and discharging time and rate. An economic-based AI model is provided for electric vehicle supply equipment stations, as a hybrid system of grid-connected solar photovoltaic (PV) and batteries. Recent technological developments of solar PV panels have made them a potentially viable alternative for conventional energy sources. However, due to the intermittent nature, the reliability and availability are not similar to traditional sources. Hence, it is crucial to estimate the solar and wind availability and contribution more accurately. There are various factors affecting the generation capacity of renewable sources. There has been vast research on the impact of factors related to climate conditions such as wind speed, air temperature, and humidity on renewable energy generation. There is an opportunity to integrate solar PV panels coupled with energy storage systems into electric vehicle supply equipment stations to provide reliable energy generated by clean sources.

Plant Optimization

A plant optimization algorithm, either central or decentralized, is provided which focuses on the following areas:
  a. Assessing opportunities to integrate solar PV panels and energy storage systems for each specific location.
  b. Providing optimal size of the PV panels and energy storage systems.
  c. Providing optimal control strategy (for instance, online day-ahead schedule of the assets)
  d. Providing cost savings and environmental benefits.

Grid Stability: Growing integration of the DCFC stations can cause a burden on the grid. All the service providers might not yet be ready to efficiently meet the aggregated EVs demand. This becomes a critical problem during peak periods. energy storage systems can be integrated into electric vehicle supply equipment stations to curtail the peak demand of the stations with high utilization rates.

Service Quality/Customer Satisfaction: energy storage systems can be integrated into electric vehicle supply equipment stations as a backup source of power in case there is an interruption in the distribution network. Consequently, customers will face unavailable stations with lower chances. As an example, during natural disaster events, utility companies might not be able to provide electricity to charging stations. Therefore, part of the demand can be met using the stored energy until the utility is restored to its working condition.

Competitive Charging Cost: The proposed schema enables the proposed infrastructure to interactively communicate with EV drivers and propose motivating price signals based on the location and time of day and week. Therefore, EV drivers are able to benefit from competitive charging costs proposed by an intelligent energy management network.

Applications

Integrating energy storage systems and distributed energy resources into the electric vehicle supply equipment infrastructure is beneficial for the EV drivers, electric vehicle supply equipment owners, and energy providers to efficiently manage the unit commitment of the network while optimizing economic, environmental, and user satisfaction metrics. An intelligent energy management network is able to efficiently schedule the charging and discharging time of the energy storage systems in real-time. If distributed energy resources are integrated into the network, power generation prediction models are also considered in the unit commitment of the energy storage systems. This offers 1) economic benefits by charging the energy storage systems whole electricity prices are lower and releasing it back to the network during the peak period, 2) environmental benefits by increasing the share of the renewable energy resources, such as Solar PV panels, 3) user satisfaction by providing uninterrupted service and service to areas with limited grid accessibility. energy storage system Supported Intelligent electric vehicle supply equipment Management augments power dispensing capabilities of an electric vehicle supply equipment during normal and some exceptional circumstances by providing a time-limited power dispensing quote bounded by a dollar amount. Such a quote can be provided in the following scenarios:

Exceptional Circumstances
 a. If an electric vehicle supply equipment is experiencing a gap in provisioned power, the energy storage system can kick in and bridge the gap for an interrupted power dispense.
 b. If an electric vehicle supply equipment is out of service, energy storage system can also temporarily be configured as an electric vehicle supply equipment.

Normal Operations

During normal operations, energy storage system can store energy, and eventually, during peak hours, an electric vehicle supply equipment can also kick in to either:
 a. limit dynamic or tiered pricing experienced by the customers or
 b. Improve unit economics for an electric vehicle supply equipment A network of energy storage system Supported Intelligent electric vehicle supply equipment Management can participate in Demand Response programs as well. Furthermore, peak shaving, load sharing, frequency regulation, and other power applications may supplement the main framework of the problem.

EVSE Energy Management

Figure 2:
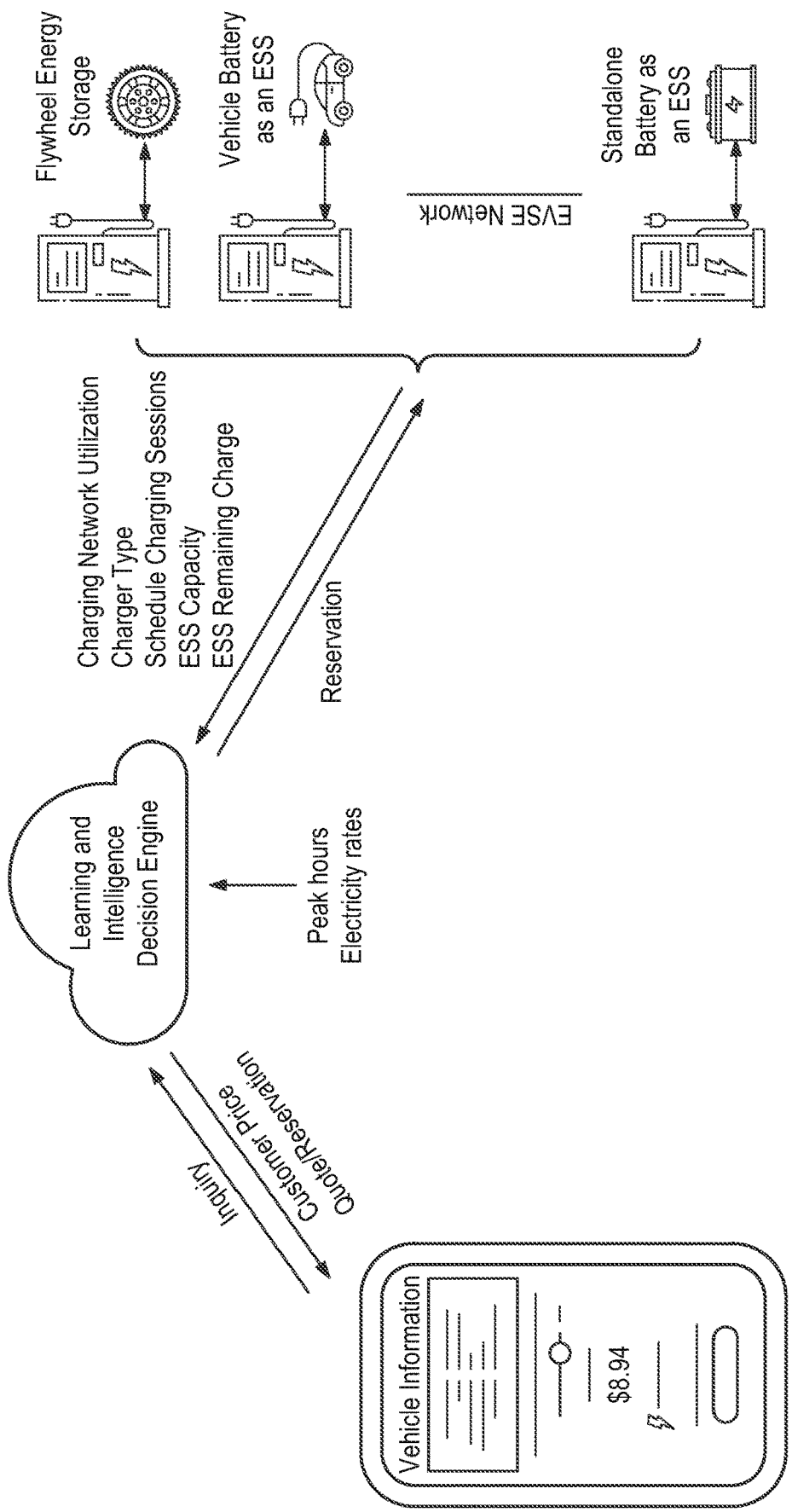
FIG. 2 is a block diagram illustrating communications between devices and systems according to an implementation.

According to one implementation, an energy management schema introduces a novel communication architecture, as shown in FIG. 2, between the electric vehicle supply equipment providers, utilities, and EV drivers while optimizing the computational latency and algorithms accuracy. The following are key components of the proposed architecture.
 a. Optimizing computational latency by coupling a cloud-level centralized controller with edge-level decentralized controllers.
 b. Optimizing the accuracy of the predictions by updating the predictions based on the received feedback from the electric vehicle supply equipment network in real-time.
 c. Enabling the energy storage systems integration and smart management of the charging and discharging routines.
 d. Enhancing distributed energy resources adoption by reducing the prediction uncertainty and enhancing generation reliability.
 e. Enabling real-time communication with EV drivers to provide uninterruptible services.
 f. Enabling electric vehicle supply equipment providers to offer real-time incentives to EV drivers for the temporal and spatial shifts of their demand. This is beneficial for EV drivers to charge their EVs at lower cost, utilities to shave the peak of their generation, and electric vehicle supply equipment providers to satisfy their customers and earn EV drivers' and utilities' trust.
 g. Offering multi-directional power flow between utilities and electric vehicle supply equipment to enhance the generation share of the distributed energy resources.
 h. Enabling vehicle-to-grid applications to enable EV drivers to communicate with the power grid to sell demand response services by either returning electricity to the grid or by throttling their charging rate.

Example Practical Application

Figure 3A:
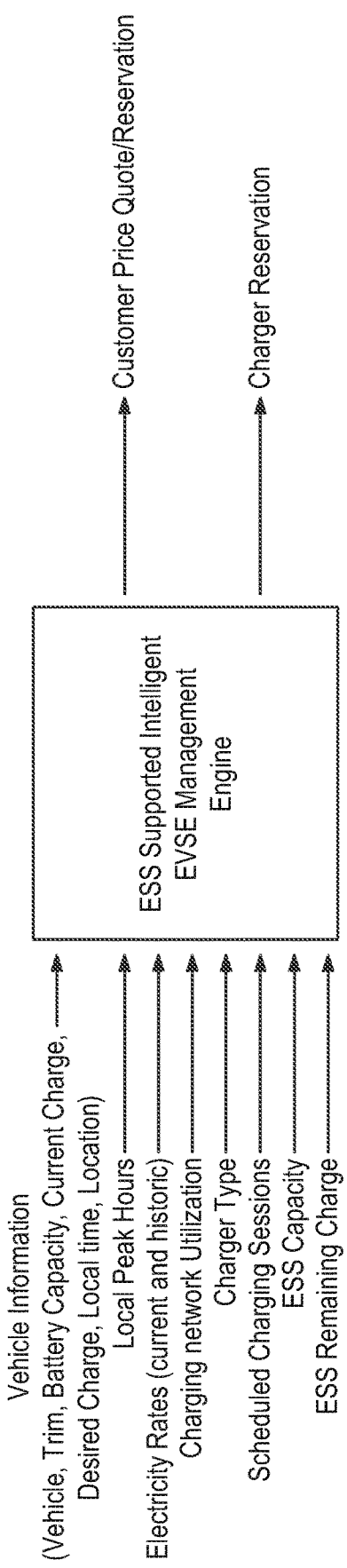
FIG. 3A is a block diagram illustrating an algorithm for generating price quotes and charger reservations based on various inputs, according to an implementation.
Figure 3B:
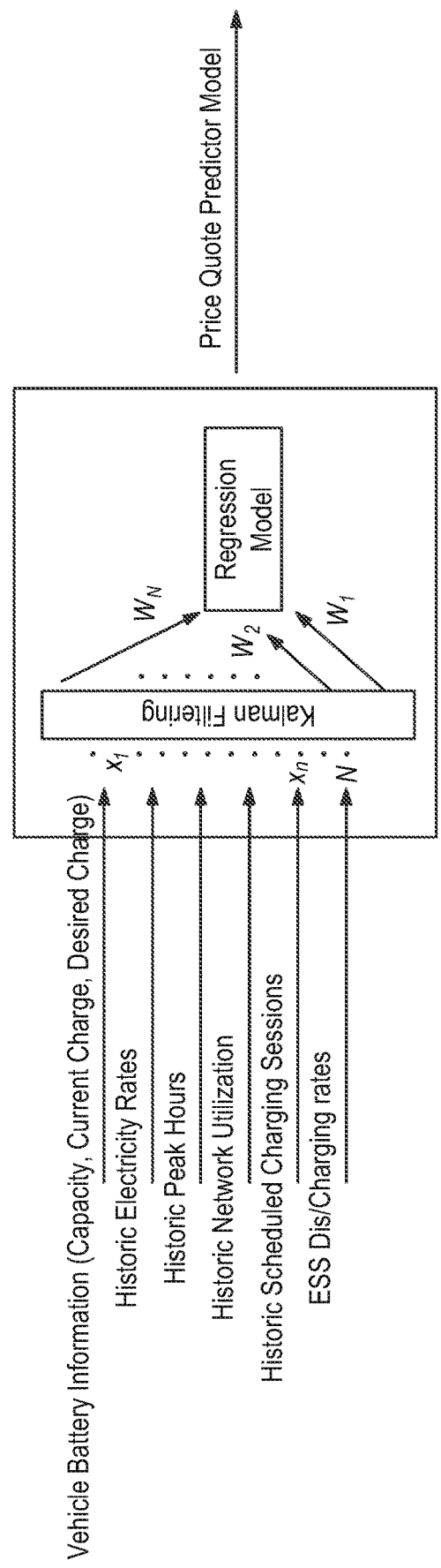
FIG. 3B is a block diagram illustrating an algorithm for generating a price quote predictor model based on various inputs, according to an implementation.

Referring to FIG. 3A, it is a block diagram illustrating an algorithm for generating price quotes and charger reservations based on various inputs, according to an implementation. FIG. 3B is a block diagram illustrating an algorithm for generating a price quote predictor model based on various inputs, according to an implementation.

It should be noted that the specific example described in this section is only one example of one of the capabilities of the proposed approach. In this example, it has been assumed that the centralized controller determines the day-ahead unit commitment of the electric vehicle supply equipment, while the decentralized controller adjusts the centralized controller signals based on the real-time feedback received from the electric vehicle supply equipment. The centralized controller communicates with utilities to obtain the day ahead electricity price signals. This communication can be expanded for various applications such as Demand Response or Frequency Regulation. In this example, it has been assumed that this communication is only limited to time-varying electricity prices. On the other hand, the centralized controller receives electric vehicle supply equipment critical measurements to estimate the current degradation state of the electric vehicle supply equipment. In addition to that, it determines the current charge status of the batteries.

Based on the models trained on historical data and weather-related information received from weather stations, such as NOAH, electric vehicle supply equipment utilization, electric vehicle supply equipment visitation, and distributed energy resource generation are forecasted. These forecasted values are the main inputs for the primary optimization model. Optimization models are able to provide optimized unit commitment of the electric vehicle supply equipment integrated with energy storage systems and distributed energy resources, motivating price strategies to EV drivers, and predictive maintenance. All these optimized signals are obtained underlying some assumptions regarding the behavior of the electric vehicle supply equipment system during the next day.

The decentralized controller is in charge of adjusting these signals to optimize the objective functions. In other words, the decentralized controller provides adaptive responses based on the observed feedback for each of the critical inputs of the system, such as visitation. For instance, the centralized controller can send the optimized values given 100 number of EVs stopping at a specific station at 10:00 AM, defined as forecasted electric vehicle supply equipment visitation. The decentralized controller constantly communicates with the stations in real-time and observe 50 number of EVs stopping at the same location at 10:00 AM. Consequently, the optimized signals for the rest of the day are adjusted accordingly.

Figure 4:
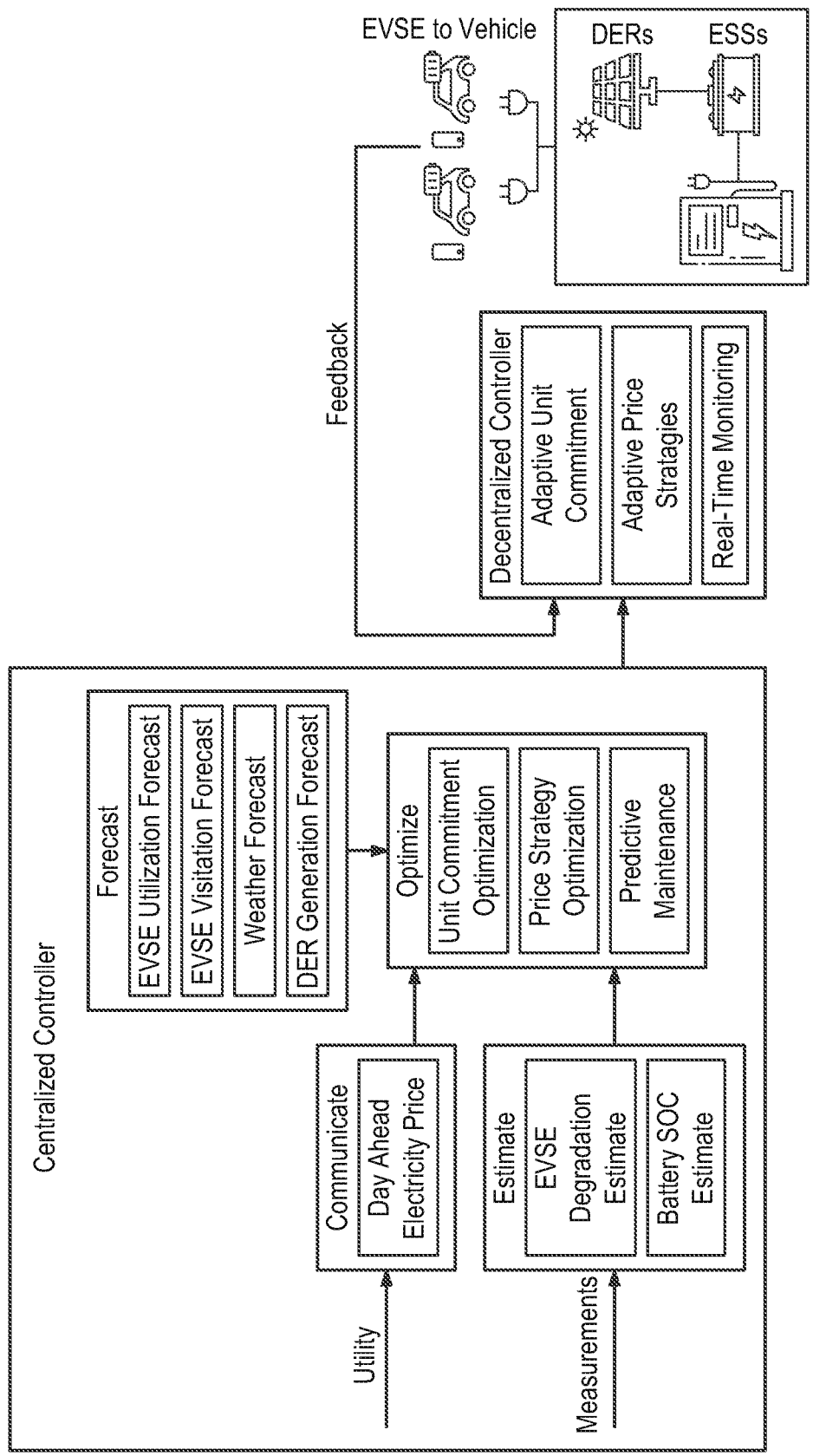
FIG. 4 is a block diagram showing communication components and data flow for the centralized and decentralized controllers, according to an implementation.

It should be noted that centralized controller is triggered once a day, for this specific example, while decentralized controllers monitor the electric vehicle supply equipment in real-time and can adjust the signals in lower resolution, for instance on an hourly basis. Based on the proposed architecture, the centralized controller is implemented on cloud to optimize the latency and computation of the network. On the other hand, the decentralized controllers perform the analytics at edge level to adjust the signals in real-time. FIG. 4 shows communication components and data flow for the centralized and decentralized controllers.

Figure 5:
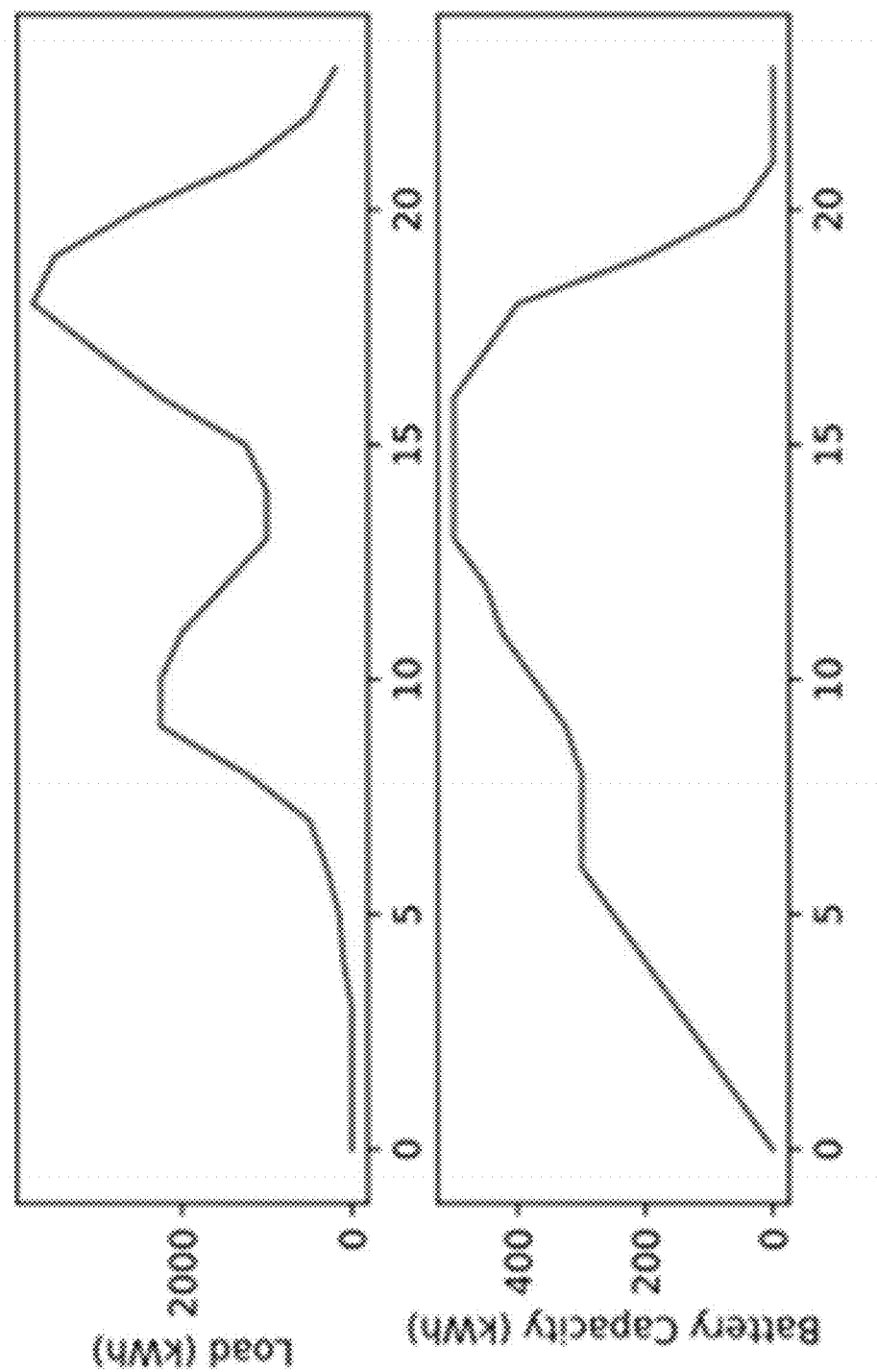
FIG. 5 is a chart illustrating the day Ahead Forecasted load and battery unit commitment determined by the centralized controller, according to an implementation.
Figure 6:
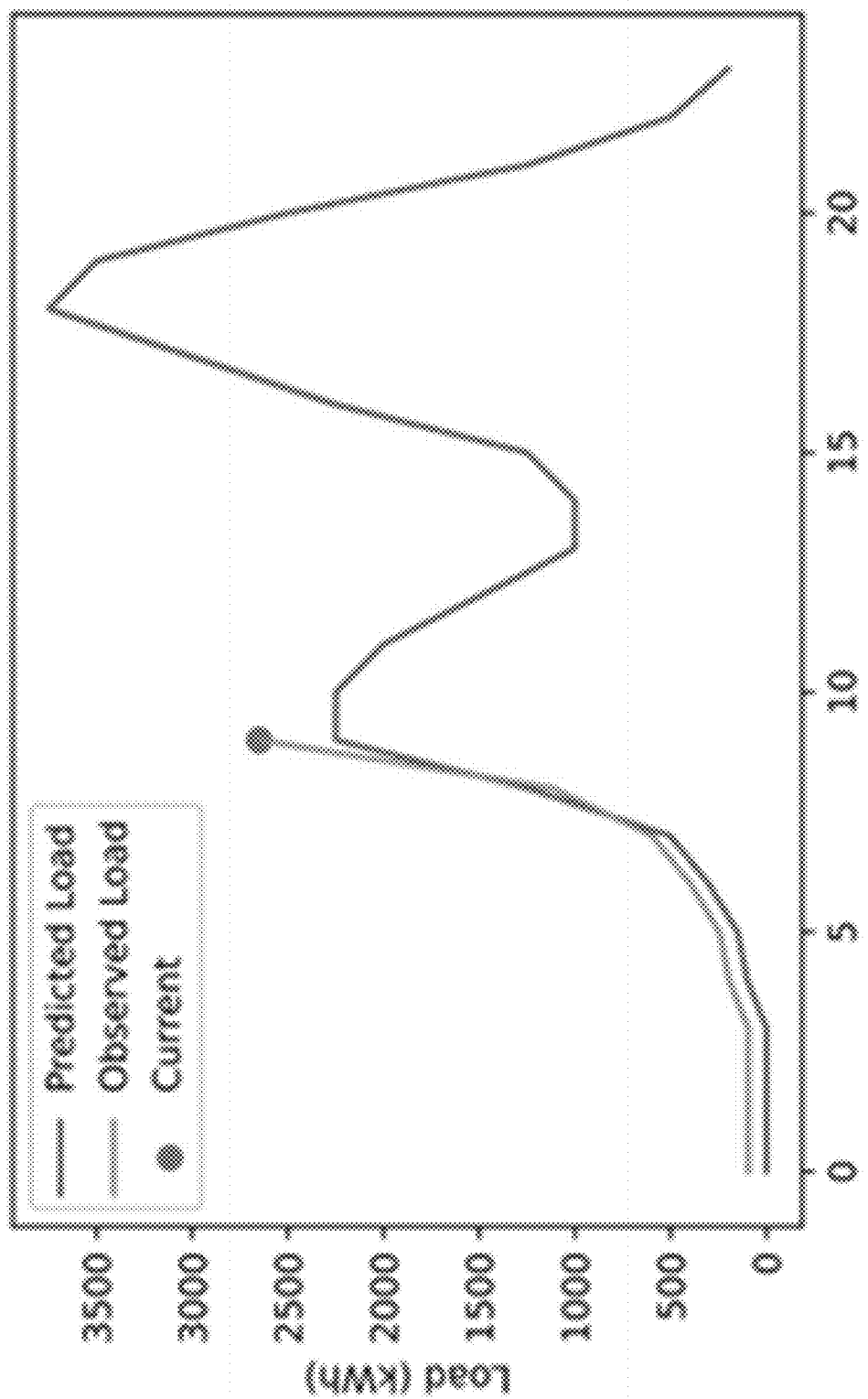
FIG. 6 is a chart that shows an example of a significant discrepancy between the centralized controller signal and the observed value in real-time, according to an implementation.

FIG. 5 presents the day Ahead Forecasted load and battery unit commitment determined by the centralized controller. Decentralized controllers monitor the electric vehicle supply equipment in real-time and observe a significant discrepancy between the forecasted load and observed value. Once this discrepancy is significant, a decentralized controller is triggered to adjust the centralized controller signals. FIG. 6 shows an example of a significant discrepancy between the centralized controller signal and the observed value in real-time.

Figure 7:
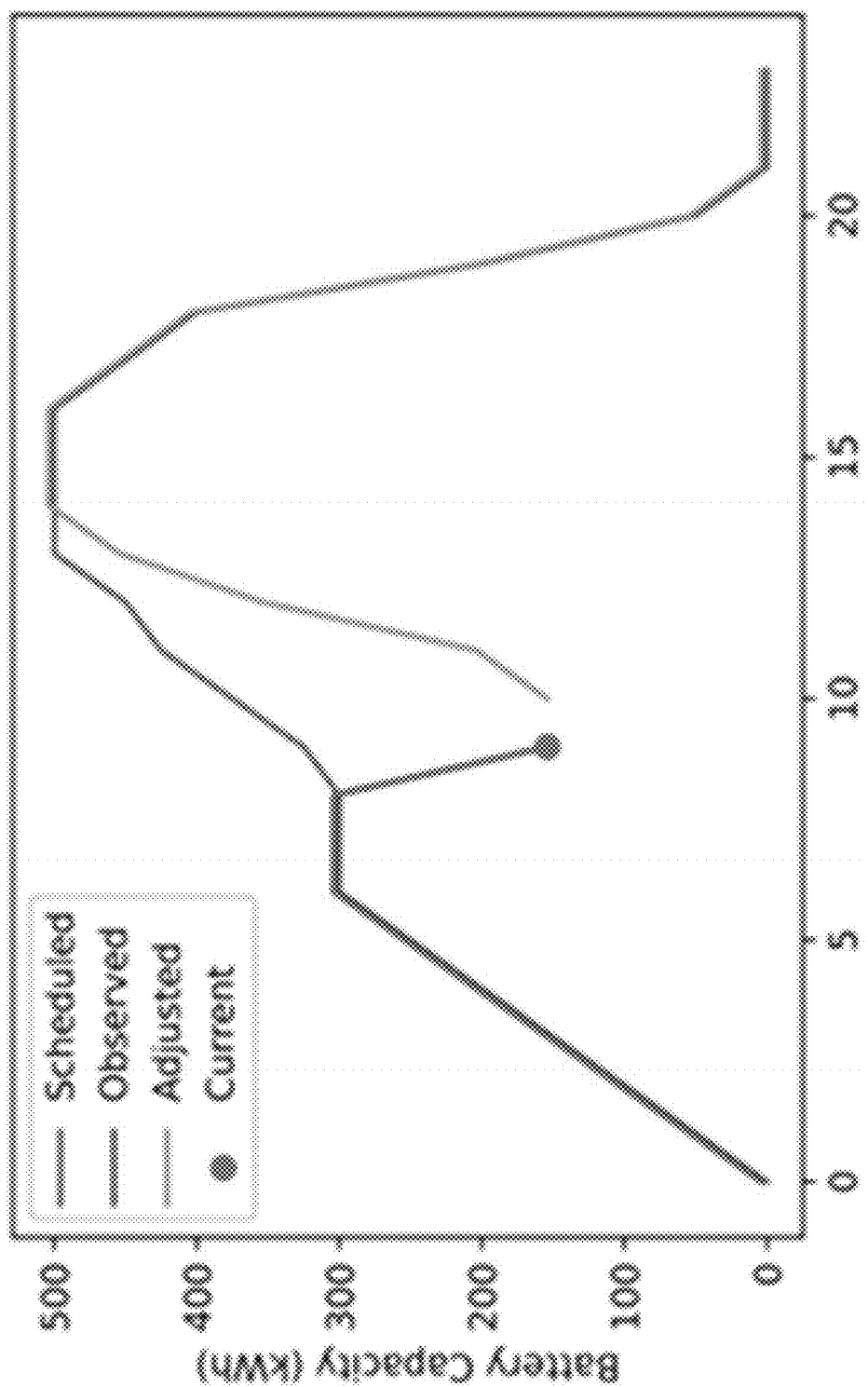
FIG. 7 is a chart that shows an example of adjusted signals by a decentralized controller, according to an implementation.

The significant discrepancy between the centralized controller signal and observed value in real-time is an indication that the decentralized controller should adjust the centralized controller signal in order to meet the demand more efficiently. FIG. 7 presents an example of the adjusted signals due to the significant discrepancy that occurred at 9:00 AM. In this example, the battery was scheduled to charge for the second peak of the day, from 4:00 PM to 8:00 PM, but since demand has increased from 2250 kWh (forecasted) to 2650 kWh (actual) at 9:00 AM, the battery provides energy to electric vehicle supply equipment to flatten the morning peak. Consequently, the battery state of the charge will be affected for the remaining hours of the day. The same process may happen at each hour to provide adoptive responses based on the dynamic change of the electric vehicle supply equipment, EV drivers, and the environment surrounding them.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
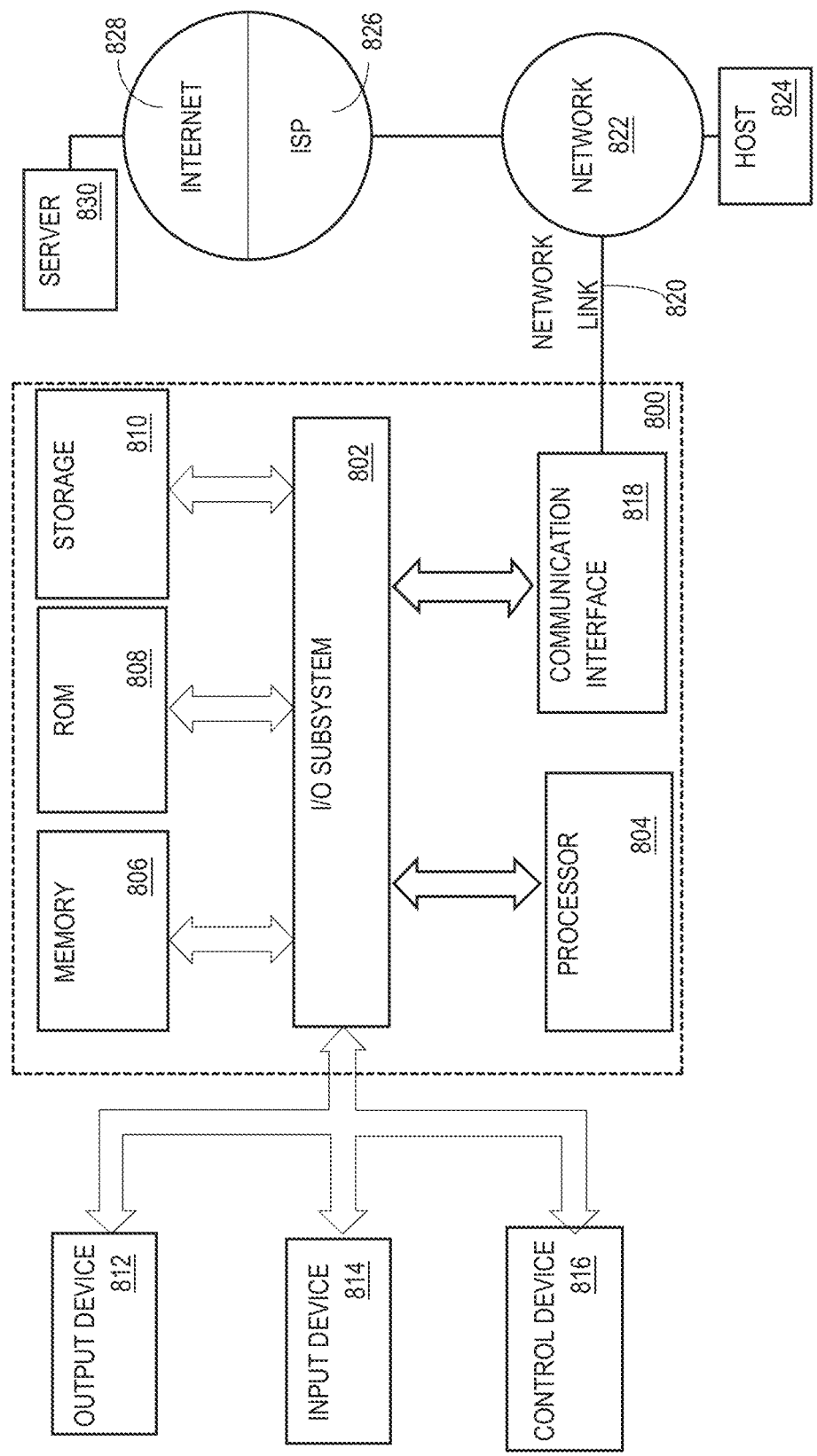
FIG. 8 is a block diagram of a computer system that may be used to perform the techniques described herein for managing/controlling energy flow, according to an implementation.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
at a centralized controller, performing:
executing algorithms to generate centralized predictions of a unit commitment for a first period of time, wherein the unit commitment is a charging and discharging schedule of energy storage systems to one or more electrical vehicle charging stations of a plurality of electrical vehicle charging stations;
wherein the centralized predictions relate to energy usage across the plurality of electric vehicle charging stations;
generating one or more centralized baseline signals based on the centralized predictions, wherein the one or more centralized baseline signals are distributed to the plurality of electrical vehicle charging stations to control unit commitments for all of the electrical vehicle charging stations in the plurality of electric vehicle charging stations based on the centralized predictions for the first period of time;
at each decentralized controller of a plurality of decentralized controllers, each decentralized controller being associated with a corresponding subset of electric vehicle charging stations in the plurality of electric vehicle charging stations, performing:
receiving the one or more centralized baseline signals;
monitoring interactions at the corresponding subset of electric vehicle charging stations during the first period of time; and
updating the one or more centralized baseline signals in real-time based on the interactions to produce one or more locally-updated baseline signals which comprise modifications of the one or more centralized baseline signals;
communicating the one or more locally-updated baseline signals to the corresponding subset of electric vehicle charging stations; and
controlling energy flow from the one or more energy storage systems to the subset of electric vehicle charging stations based on the one or more locally-updated baseline signals.

2. The method of claim 1 wherein:
the centralized predictions include predicted values of one or more attributes, and the one or more attributes include one or more of:
a number of EV drivers,
weather-related conditions,
guest visitation data, or
grid restrictions.

3. The method of claim 1 wherein the centralized predictions include one or more of:
electric vehicle supply equipment utilization rate,
distributed energy resource generation, or
load profile.

4. The method of claim 1 wherein generating one or more centralized baseline signals is based on day-ahead electricity price information obtained by the centralized controller from one or more utilities.

5. The method of claim 1 wherein generating the centralized predictions includes estimating a current degradation state of electric vehicle supply equipment.

6. The method of claim 1 wherein generating the centralized predictions includes estimating a charge state of one or more energy storage systems.

7. The method of claim 1 wherein generating the centralized predictions includes estimating:
electric vehicle supply equipment utilization,
electric vehicle supply equipment visitation, and
distributed energy resource generation.

8. The method of claim 7 wherein the centralized predictions are generated based on at least:
models trained on historical data; and
weather-related information.

9. The method of claim 1 further comprising:
each of the plurality of decentralized controllers sending the locally-updated baseline signals to the centralized controller; and
at the centralized controller, updating the one or more centralized baseline signals based on the locally-updated baseline signals received from the plurality of decentralized controllers.

10. The method of claim 1 wherein:
the one or more centralized baseline signals reflect a predicted load; and the locally-updated baseline signals are generated in response to discrepancy between the predicted load and an observed load exceeding a threshold.

11. A system comprising:
a centralized controller comprising one or more computing devices, wherein the centralized controller is configured to perform:
  executing algorithms to generate centralized predictions of a unit commitment for a first period of time, wherein the unit commitment is a charging and discharging schedule of energy storage systems to one or more electrical vehicle charging stations of a plurality of electrical vehicle charging stations;
  wherein the centralized predictions relate to energy usage across the plurality of electric vehicle charging stations;
  generating one or more centralized baseline signals based on the centralized predictions, wherein the one or more centralized baseline signals are distributed to the plurality of electrical vehicle charging stations to control unit commitments for all of the electrical vehicle charging stations in the plurality of electric vehicle charging stations based on the centralized predictions for the first period of time;
a plurality of decentralized controllers;
  wherein each decentralized controller of the plurality of decentralized controllers comprises one or more computing devices, is associated with a corresponding subset of electric vehicle charging stations in the plurality of electric vehicle charging stations, and is configured to performing:
  receiving the one or more centralized baseline signals;
  monitoring interactions at the corresponding subset of electric vehicle charging stations during the first period of time; and
  updating the one or more centralized baseline signals in real-time based on the interactions to produce one or more locally-updated baseline signals which comprise modifications of the one or more centralized baseline signals;
communicating the one or more locally-updated baseline signals to the corresponding subset of electric vehicle charging stations; and
wherein energy flow is controlled from the one or more energy storage systems to the subset of electric vehicle charging stations based on the one or more locally-updated baseline signals.

12. The system of claim 11 wherein:
the centralized predictions include predicted values of one or more attributes, and the one or more attributes include one or more of:
  a number of EV drivers,
  weather-related conditions,
  guest visitation data, or
  grid restrictions.

13. The system of claim 11 wherein the centralized predictions include one or more of:
  electric vehicle supply equipment utilization rate,
  distributed energy resource generation, or
  load profile.

14. The system of claim 11 wherein generating one or more centralized baseline signals is based on day-ahead electricity price information obtained by the centralized controller from one or more utilities.

15. The system of claim 11 wherein generating the centralized predictions includes estimating a current degradation state of electric vehicle supply equipment.

16. The system of claim 11 wherein generating the centralized predictions includes estimating a charge state of one or more energy storage systems.

17. The system of claim 11 wherein generating the centralized predictions includes estimating:
  electric vehicle supply equipment utilization,
  electric vehicle supply equipment visitation, and
  distributed energy resource generation.

18. The system of claim 17 wherein the one or more centralized predictions are generated based on at least:
  models trained on historical data; and
  weather-related information.

19. The system of claim 11 wherein:
  each of the plurality of decentralized controllers is configured to send the locally-updated baseline signals to the centralized controller; and
  at the centralized controller is configured to update the one or more centralized baseline signals based on the locally-updated baseline signals received from the plurality of decentralized controllers.

20. The system of claim 11 wherein:
the one or more centralized baseline signals reflect a predicted load; and
the locally-updated baseline signals are generated in response to discrepancy between the predicted load and an observed load exceeding a threshold.

\* \* \* \* \*